(No Model.)
2 Sheets—Sheet 1.

E. THOMSON.
DYNAMO ELECTRIC MACHINE OR MOTOR.

No. 508,658.  Patented Nov. 14, 1893.

WITNESSES.
Alec F. Macdonald.
John T. Gibboney

INVENTOR.
Elihu Thomson (No Model.) 2 Sheets—Sheet 2.

E. THOMSON.
DYNAMO ELECTRIC MACHINE OR MOTOR.

No. 508,658. Patented Nov. 14, 1893.

Witnesses.
Alec F. Macdonald.
John N. Gibboney

Inventor.
Elihu Thomson

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

DYNAMO-ELECTRIC MACHINE OR MOTOR.

SPECIFICATION forming part of Letters Patent No. 508,658, dated November 14, 1893.

Application filed May 23, 1892. Serial No. 434,074. (No model.)

*To all whom it may concern:*

Be it known that I, ELIHU THOMSON, a citizen of the United States, residing at Swampscott, county of Essex, and State of Massachusetts, have invented a certain new and useful Improvement in Dynamo-Electric Machines or Motors, of which the following is a specification.

My present invention relates to a method of and apparatus whereby the counter-electromotive force of the armature of an electric motor or whereby the electromotive force developed in a dynamo electric machine may be varied during the operation of the motor or dynamo.

Briefly, my invention consists in appliances which without short-circuiting are adapted to change the actual or working length of the armature helices or bobbins while the apparatus is at work and thereby with a given field strength to govern the electromotive force or counter-electromotive force which is developed by the armature coil system.

My invention is particularly applicable to cases of varying speed and torque, as in electric traction motors, or in electric hoists or the like. It also enables the starting of an electric motor to be accomplished without the use of rheostats and the regulation of speed to be in like manner effected without putting a resistance into the circuit when the motor is operated from constant potential mains. As applied to generators it may be used to change the voltage of the generator so as to adapt the same machine to deliver currents of different voltages without stopping the machine to make any change or coupling of the coils.

Figure 1:
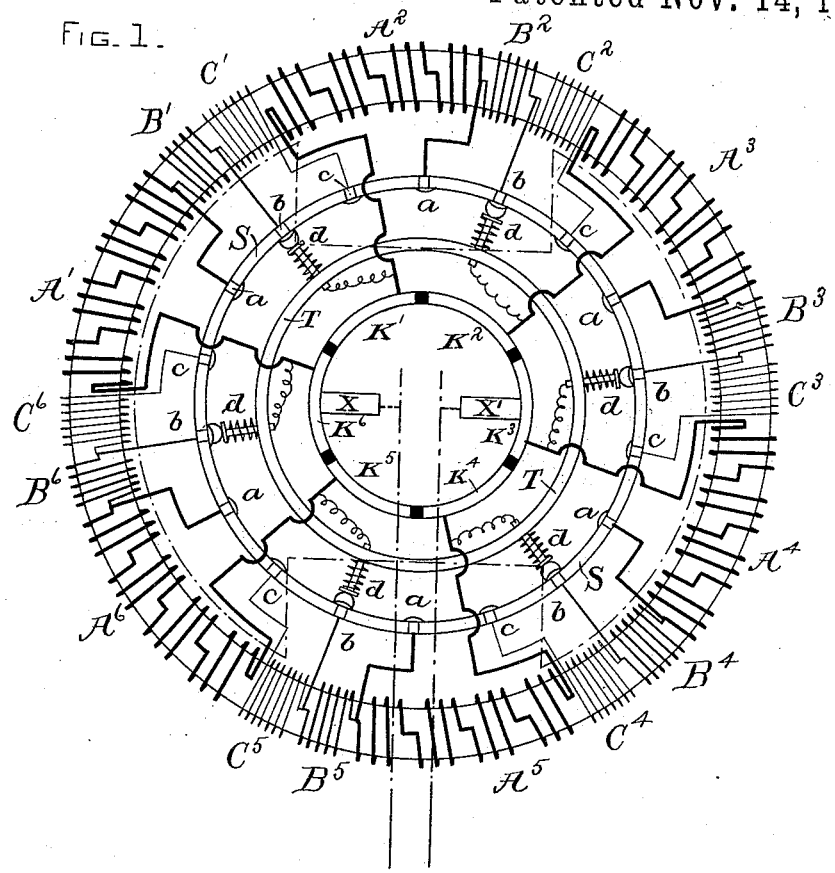
Figure 4:
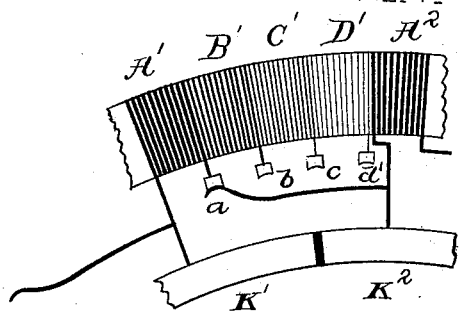
Figure 3:
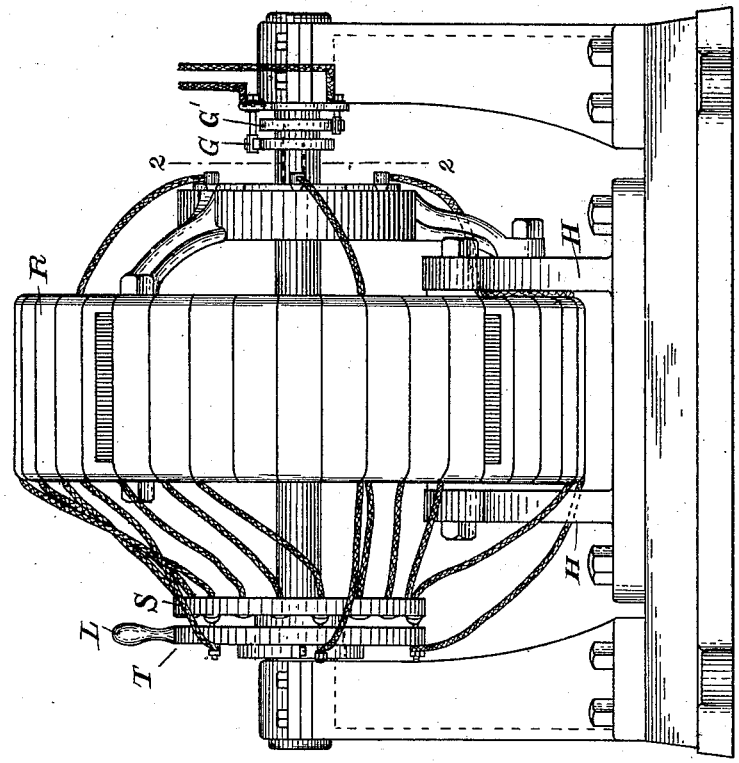
Figure 2:
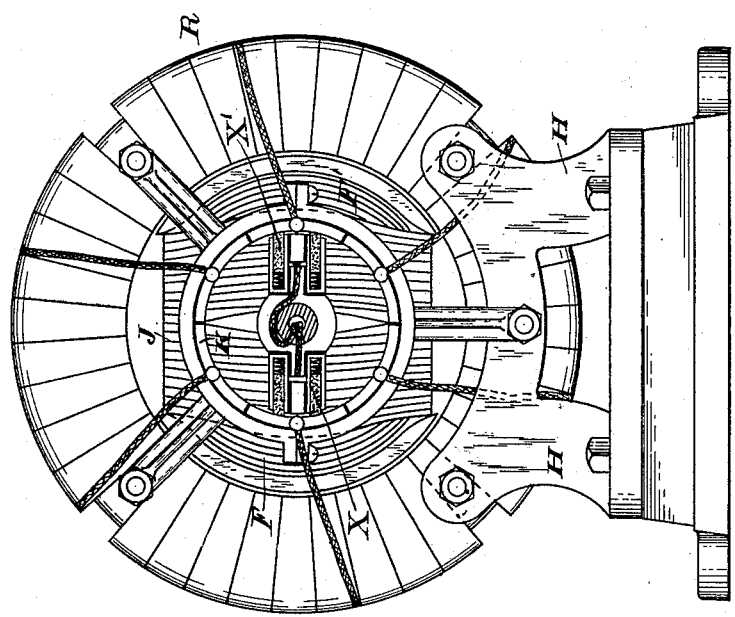

In the drawings Figure 1 shows the general scheme of my invention as applied to the armature of a motor or dynamo. Fig. 2 is an end elevation of a motor embodying my invention, the shaft being shown in section on line 2—2 of Fig. 3. Fig. 3 is a side elevation of said motor, and Fig. 4 shows a modification.

The commutator segments are marked $K'$, $K^2$, $K^3$, &c., and the brushes $X$, $X'$ bearing thereon are in the figure supposed to be revolving brushes while the commutator remains stationary. These brushes receive current or deliver current according to whether the machine is a motor or generator.

The external part of the figure represents the armature winding in black lines. At the parts $A'$, $A^2$, $A^3$, $A^4$, $A^5$, $A^6$ is seen the coarse heavy winding of few turns one end of which is permanently attached to the segment. The other end of the coarse winding is carried to the switching ring S, S, and is also attached to the beginning of a finer coil $B'$, $B^2$, $B^3$, $B^4$, $B^5$, $B^6$, of wire from which it is carried to another point on the switching ring S marked $b$. Again from the end $B'$ a finer coil $C'$, $C^2$, $C^3$, $C^4$, $C^5$, $C^6$, is connected and its final terminal is attached to the metallic contact of the switching rings at $c$ as shown. The switching ring S is stationary in position in relation to the coils and a second ring T T is movable with relation to the other ring S S, and carries a number of spring contacts, as at $d$ which contacts are permanently connected by a flexible wire with the heavy wire leading to the commutator segments. By a rotation of the ring T T with respect to S S the movable contact $d$ may be made to bear upon the contacts $c\ c\ c$ or the contacts $b\ b\ b$, &c., or the contacts $a\ a\ a$ and it will be noticed that when they bear upon contacts $c\ c\ c$ all the winding of the armature, both fine and coarse, will be in operation. In other words all the turns of the armature will be effective. When they bear upon $b\ b\ b$ the finer coils $C'\ C^2\ C^3$, &c., will be cut out or open circuited. When they bear upon the contacts $a\ a\ a$, &c., both the coils $C'\ C^2\ C^3$, &c., and $B'\ B^2\ B^3$, &c., will be cut out, leaving only the coarse winding with few turns in action. Of course there might be many more sections of winding and the result would be the same only the range would be extended, or the same winding might be broken up into more divisions than are shown and finer gradations be obtained. The windings are shown successively arranged on the armature, but they might of course be superposed, and in fact this would be the better method of arranging them in most cases. In embodying this principle in a working machine Figs. 2 and 3 show one of the forms of apparatus obtained. A stationary ring armature R R constructed of laminated iron suitably sustained in supports such as are shown at H H, is wound with various coils and of different gages, and different number of turns if desired, and connections made to a stationary commutator, as at K. A field magnet whose poles are marked F F' may be made to revolve within the ring by mounting it on a suitable shaft, and it may be energized by a coil J wound thereon in the usual manner. Rings G G' upon the shaft enable current to be fed into the field coils and enable also current to be carried to the revolving brushes X X' mounted in a suitable rotating and insulated holder. These brushes revolve inside of the hollow commutator K and the brushes are in a measure assisted to make contact by the centrifugal force exerted in operation. At T is the movable contact ring, corresponding to T in Fig. 1, and at S is the stationary contact support, corresponding to S, Fig. 1. By the handle L the relations of the contact pieces or the movable portion T may be changed with relation to those on S, when the changes which have been stated as obtainable with the arrangement Fig. 1 may be represented in the machine, as shown.

Suitable connections from the coils of the armature and made in correspondence with the scheme Fig. 1 may be used and are indicated in Fig. 3. The field coil J may be either in series with the armature conductors or in shunt to the brushes, as desired, according to the purpose for which the apparatus is to be applied.

Fig. 4 shows in a separate form one of the elements of my invention, that is a single armature coil section connected with its commutator segments K' and the gradations of the windings are shown by the lines. It will be seen that segment $K^2$ while in permanent connection with the coarse coil $A^2$ may be also connected either with $a$ so as to include the coil A' only between the segments K' and $K^2$ or with the connection $b$ so as to include A' B' between those segments, or with connection $c$ including A' B' C' or with connection $d'$ including A' B' C' D' between the two adjacent segments K' and $K^2$. It will be seen, also, that the sections, as in the figure, B' C' D', are open circuited as the terminal at $d'$ is a free terminal. The idle sections of conductor on the armature cannot therefore be the source of short-circuits after being open circuited, but can only act as if they were not present.

If there be gradations in the size and in the number of turns of the different sections A' B' C' D', that is the wire not only gets finer as D' is approached but at the same time gets much longer, it will be evident that a very great range in the electromotive force developed can be obtained, and consequently that in a motor the start may be made with all the windings in connection and an increase of speed obtained on constant potential circuits by cutting out in succession the finer windings, proceeding from the finest to the coarse, and therefore at the highest speeds with the heaviest currents only the coarse sections may be retained in connection.

What I claim as new, and desire to secure by Letters Patent, is—

1. An electric motor having each helix composed of a series of coils of successively finer wire, and means for switching one or more of said coils into circuit, while the motor is running, substantially as described.

2. An electric motor having each helix composed of a series of coils of successively increasing resistance, and means for switching one or more of said coils into circuit, while the motor is running, substantially as set forth.

3. An electric motor having each helix divided into two or more portions, each connected with a fixed contact, and a movable contact connected with the adjacent helix and adapted to close the circuit through any one of the fixed contacts, substantially as set forth.

4. In an electric motor having a stationary armature, comprising the helices A', B', C', $A^2$, $B^2$, $C^2$, &c., the fixed contacts $a$, $b$, $c$ connected with the ends of the sections A', B', C', &c., and the movable contacts $d$, substantially as described.

5. The combination with an electric motor having a stationary armature comprising the sectional helices hereinbefore described, of the stationary ring S provided with contacts connected each with its respective section of the armature, and the movable ring T carrying one contact for each helix, adapted to be brought to bear upon corresponding fixed contacts, substantially as described.

In witness whereof I hereto set my hand this 20th day of May, 1892.

ELIHU THOMSON.

Witnesses:
JOHN W. GIBBONEY,
BENJAMIN B. HULL.